(12) United States Patent
Loera

(10) Patent No.: US 11,317,569 B2
(45) Date of Patent: May 3, 2022

(54) BUG-CATCHING CURTAIN SYSTEM

(71) Applicant: Alejandro Ramos Loera, Aromas, CA (US)

(72) Inventor: Alejandro Ramos Loera, Aromas, CA (US)

( * ) Notice: Subject to any disclaimer, the term of this patent is extended or adjusted under 35 U.S.C. 154(b) by 328 days.

(21) Appl. No.: 16/590,951

(22) Filed: Oct. 2, 2019

(65) Prior Publication Data

US 2021/0100176 A1 Apr. 8, 2021

(51) Int. Cl.
| | |
|---|---|
| A01G 13/10 | (2006.01) |
| A01M 1/16 | (2006.01) |
| B66D 1/26 | (2006.01) |
| B66D 1/12 | (2006.01) |
| A01G 9/26 | (2006.01) |
| A01M 5/06 | (2006.01) |

(52) U.S. Cl.
CPC ............. *A01G 13/10* (2013.01); *A01G 9/26* (2013.01); *A01M 1/165* (2013.01); *A01M 5/06* (2013.01); *B66D 1/12* (2013.01); *B66D 1/26* (2013.01)

(58) Field of Classification Search
CPC ..... A01G 13/10; A01M 5/06; A01M 2200/01; A01M 3/04; A01M 1/14
See application file for complete search history.

(56) References Cited

U.S. PATENT DOCUMENTS

| | | | | |
|---|---|---|---|---|
| 1,879,813 | A * | 9/1932 | Molitor | A01G 13/10 47/32.4 |
| 2,154,431 | A * | 4/1939 | Blair | A01M 1/165 242/379 |
| 4,064,648 | A * | 12/1977 | Cary | A01G 9/227 47/17 |
| 5,433,663 | A | 7/1995 | Henningsson et al. | |
| 6,312,139 | B1 * | 11/2001 | Baker | A01G 9/249 362/145 |
| 2007/0214714 | A1 | 9/2007 | Harnois et al. | |

FOREIGN PATENT DOCUMENTS

| | | |
|---|---|---|
| CN | 201422293 Y | 3/2010 |
| CN | 101715758 A | 6/2010 |
| CN | 104115712 A | 10/2014 |
| DE | 19952481 A1 | 5/2001 |
| JP | 11032648 A | 2/1999 |
| JP | 2000228919 A | 8/2000 |
| KR | 2019068790 A | 6/2019 |

* cited by examiner

*Primary Examiner* — Joshua J Michener
*Assistant Examiner* — Nicole Paige Maccrate
(74) *Attorney, Agent, or Firm* — Douglas L. Weller

(57) ABSTRACT

A bug-catching curtain system includes a plurality of curtains composed of adhesive material suspended from rigid framing material. A drive shaft is supported by the support structure. A plurality of primary cables extending out from a plurality of spindles that are mounted on the drive shaft. A plurality of support cables are attached to the primary cable and to the rigid framing material. The plurality of support cables suspend the plurality of curtains between rows of plants. A height at which the plurality of curtains are suspended is varied by using the turning the drive shaft to let out and to wind in the plurality of primary cables.

20 Claims, 5 Drawing Sheets

BUG-CATCHING CURTAIN SYSTEM

BACKGROUND

Insects can damage crops by eating leaves or burrowing in roots, stems or fruits. Insects can also transmit bacterial, viral or fungal infections into crops. When pesticides are used to combat insects, residue from the pesticides can be ingested by humans and accumulate in fat deposits of the body where they can eventually cause damage.

DESCRIPTION OF THE EMBODIMENT

Figure 1:
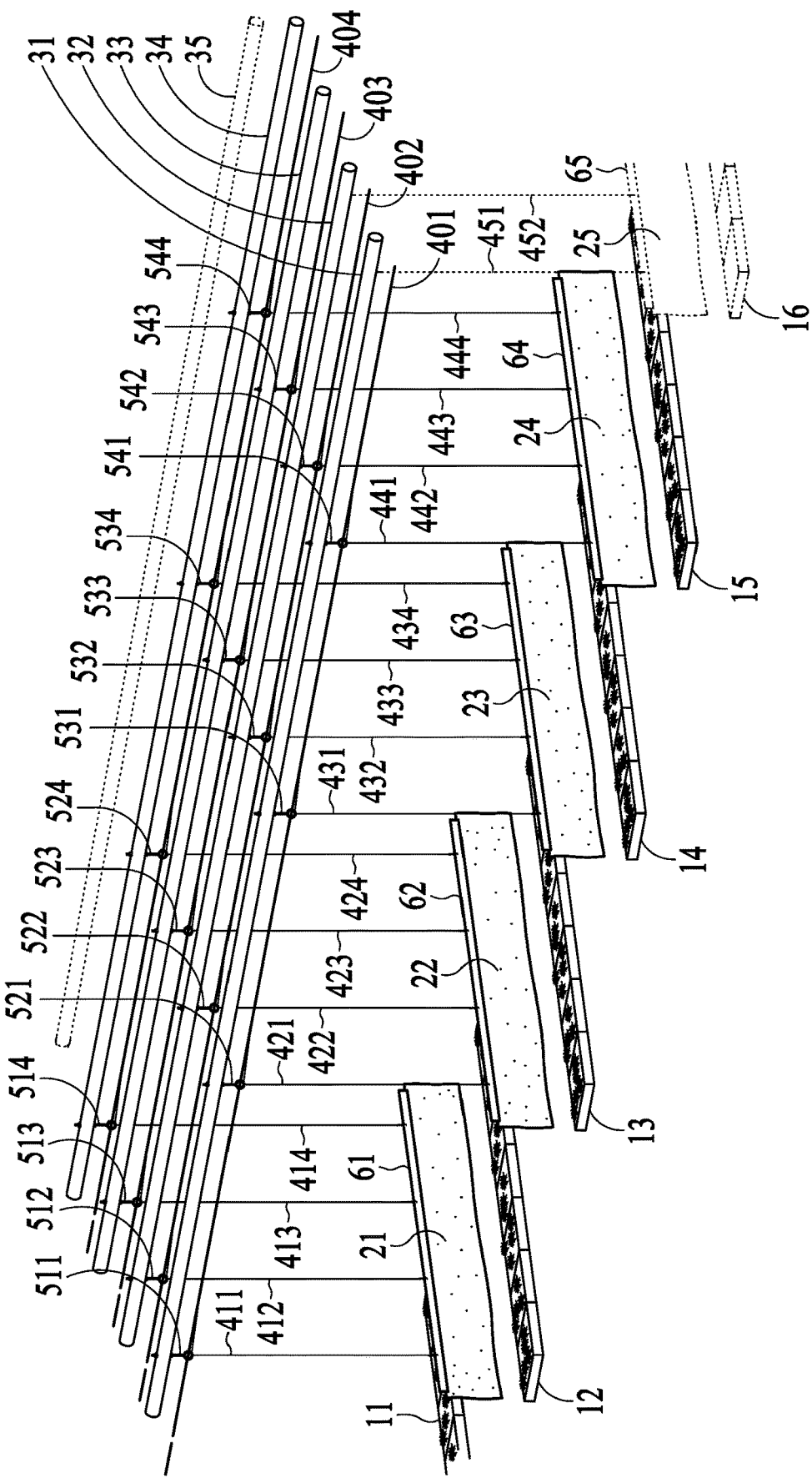
FIG. 1 and FIG. 2 show simplified diagrams of a bug-catching curtain system used to reduce insects within crop growing environment in accordance with an implementation.
Figure 2:
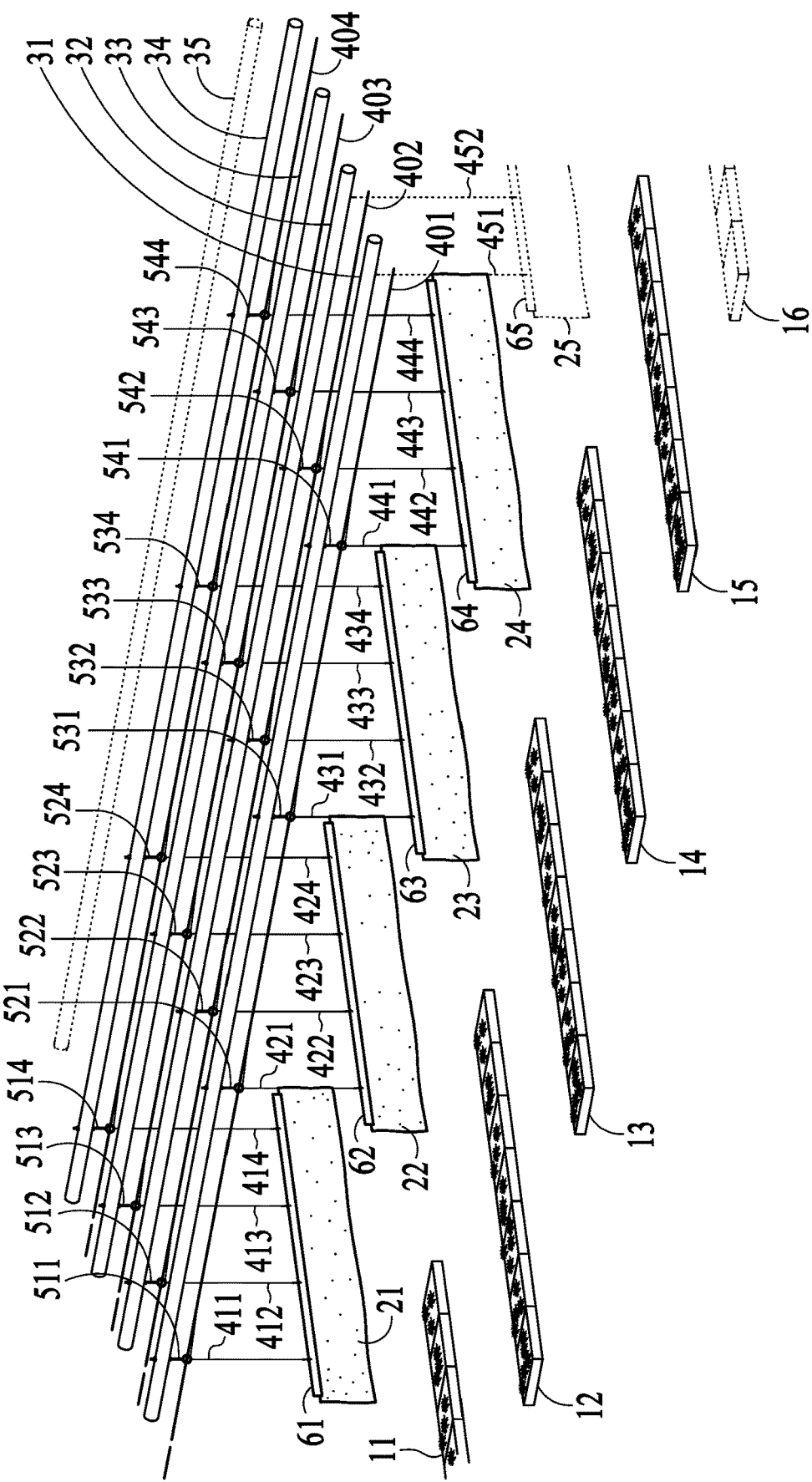

FIG. 1 and FIG. 2 show simplified diagrams of a bug-catching curtain system used to reduce insects within a crop growing environment. For example, the crop growing environment is a greenhouse or other indoor environment where crops are grown. Alternatively, the crop growing environment can be outside such as an agricultural growing field.

FIG. 1 shows bug-catching curtain material 21 suspended between a row of plants 11 and a row of plants 12. Likewise, bug-catching curtain material 22 is suspended between row of plants 12 and a row of plants 13, bug-catching curtain material 23 is suspended between row of plants 13 and a row of plants 14 and bug-catching curtain material 24 is suspended between row of plants 14 and a row of plants 15. Depending upon implementation, more or less rows of plants may be protected. For example, bug-catching curtain material 21 through 24 is composed of commercially available double-sided adhesive material such as AG Rolls available from Catchmaster, AP&g Co., Inc. For example, bug-catching curtain material 21 through 24 is 12 inches in height and extends the full length or a partial length of a row of plants.

A support structure is used to suspend bug-catching curtain material 21 through 24. In FIG. 1 part of the support structure is shown as a structure section 31, a structure section 32, a structure section 33 and a structure section 34. For example, structure sections 31 through 34 are implemented in one implementation as galvanized tubes with 1.5 millimeter thick tubing arranged with a diameter of 40 millimeters; however, other structural material such as metal, wood or plastic and so on that is capable of supporting bug-catching curtain material 21 through 24 can be used. The support structure can be, for example, a full frame that rests on the ground, or can be attached to an existing structure and shaped based on the support provided by the existing structure.

FIG. 1 shows eye bolts attached to each of structure sections 31 through 34. An eye bolt 511, an eye bolt 521, an eye bolt 531 and an eye bolt 541 are shown attached to structure section 31. An eye bolt 512, an eye bolt 522, an eye bolt 532 and an eye bolt 542 are shown attached to structure section 32. An eye bolt 513, an eye bolt 523, an eye bolt 533 and an eye bolt 543 are shown attached to structure section 33. An eye bolt 514, an eye bolt 524, an eye bolt 534 and an eye bolt 544 are shown attached to structure section 34.

Primary cables are threaded through the eye bolts. For example, a primary cable 401 is shown threaded through eye bolt 511, eye bolt 521, eye bolt 531 and eye bolt 541. A primary cable 402 is shown threaded through eye bolt 512, eye bolt 522, eye bolt 532 and eye bolt 542. A primary cable 403 is shown threaded through eye bolt 513, eye bolt 523, eye bolt 533 and eye bolt 543. A primary cable 404 is shown threaded through eye bolt 514, eye bolt 524, eye bolt 534 and eye bolt 544. For example, each of primary cable 401, primary cable 402, primary cable 403, primary cable 404 is composed of one-eighth thickness galvanized steel wire. Other types of primary cable may be selected based on the load required to be supported in particular implementations.

For example, the bug-catching curtain material may be attached to rigid framing material, such as a rail, to aid in hanging the bug-catching curtain material. For example, as shown in FIG. 1, bug-catching curtain material 21 is attached to a rail 61. Bug-catching curtain material 22 is attached to a rail 62. Bug-catching curtain material 23 is attached to a rail 63. Bug-catching curtain material 24 is attached to a rail 64. For example, rails 61-64 are implemented using poly lock rails for which wiggle wire is used to secure the bug-catching curtain material to the rails. The poly lock include lock channels. The wiggle wire is composed of spring wire within the lock channel that secure the bug-catching material within the lock channels Support cables branching from primary cables 401 through 404 are used to connect the rails to primary cables 401 through 404. For example, the support cables are composed of nylon wire, metal wire or some other material sufficiently strong and pliant to support the bug-catching material.

For example, a support cable 411 is attached to rail 61 and travels through eye bolt 511 to connect to primary cable 401. A support cable 412 is attached to rail 61 and travels through eye bolt 512 to connect to primary cable 402. A support cable 413 is attached to rail 61 and travels through eye bolt 513 to connect to primary cable 403. A support cable 414 is attached to rail 61 and travels through eye bolt 514 to connect to primary cable 404.

A support cable 421 is attached to rail 62 and travels through eye bolt 521 to connect to primary cable 401. A support cable 422 is attached to rail 62 and travels through eye bolt 522 to connect to primary cable 402. A support cable 423 is attached to rail 62 and travels through eye bolt 523 to connect to primary cable 403. A support cable 424 is attached to rail 62 and travels through eye bolt 524 to connect to primary cable 404.

A support cable 431 is attached to rail 63 and travels through eye bolt 531 to connect to primary cable 401. A support cable 432 is attached to rail 63 and travels through eye bolt 532 to connect to primary cable 402. A support cable 433 is attached to rail 63 and travels through eye bolt 533 to connect to primary cable 403. A support cable 434 is attached to rail 63 and travels through eye bolt 534 to connect to primary cable 404.

A support cable 441 is attached to rail 64 and travels through eye bolt 541 to connect to primary cable 401. A support cable 442 is attached to rail 64 and travels through eye bolt 542 to connect to primary cable 402. A support cable 443 is attached to rail 64 and travels through eye bolt 543 to connect to primary cable 403. A support cable 444 is attached to rail 64 and travels through eye bolt 544 to connect to primary cable 404.

A structure section 35, a support cable 451, a support cable 452, bug-catching curtain material 25, a row of plants 16 and a rail 65 are included in FIG. 1 and FIG. 2 to illustrate that the number and size of bug-catching curtains is varied depending upon the implementation. For example, the number of support cables used to hang each bug-catching curtain also is varied based on the row length, type of adhesive material used, and other variables that vary with implementation. FIG. 1 and FIG. 2 are used only to show the basic implementation which can be configured dependent upon the needs of the specific implementation.

Primary cables 401 through 404 and the support cables that branch from primary cables 401-404 are used to raise and lower the position of bug-catching curtain material 21 through 24. For example, FIG. 1 shows bug-catching curtain material 21 through 24 lowered close to the location of rows of plants 11 through 15. The height of bug-catching curtain material 21 through 24 is selected, for example, to optimize the effectiveness of bug-catching curtain material 21 through 24 to capture insects hovering near rows of plants 11 through 15. For example, the location of bug-catching curtain material 21 through 24 may be adjusted to optimize the location of bug-catching curtain material 21 through 24 based on flying patterns of particular insects targeted for removal from rows of plants 11 through 15.

FIG. 2 shows bug-catching curtain material 21 through 24 lifted away from the location of rows of plants 11 through 15. This is done, for example, to provide room for workers to more easily access rows of plants 11 through 15. The ability to adjust the location of bug-catching curtain material 21 through 24 provides for both ease of access of rows of plants 11 through 15 and for specific targeting of flying insects that may be harmful to the crop.

Figure 3:
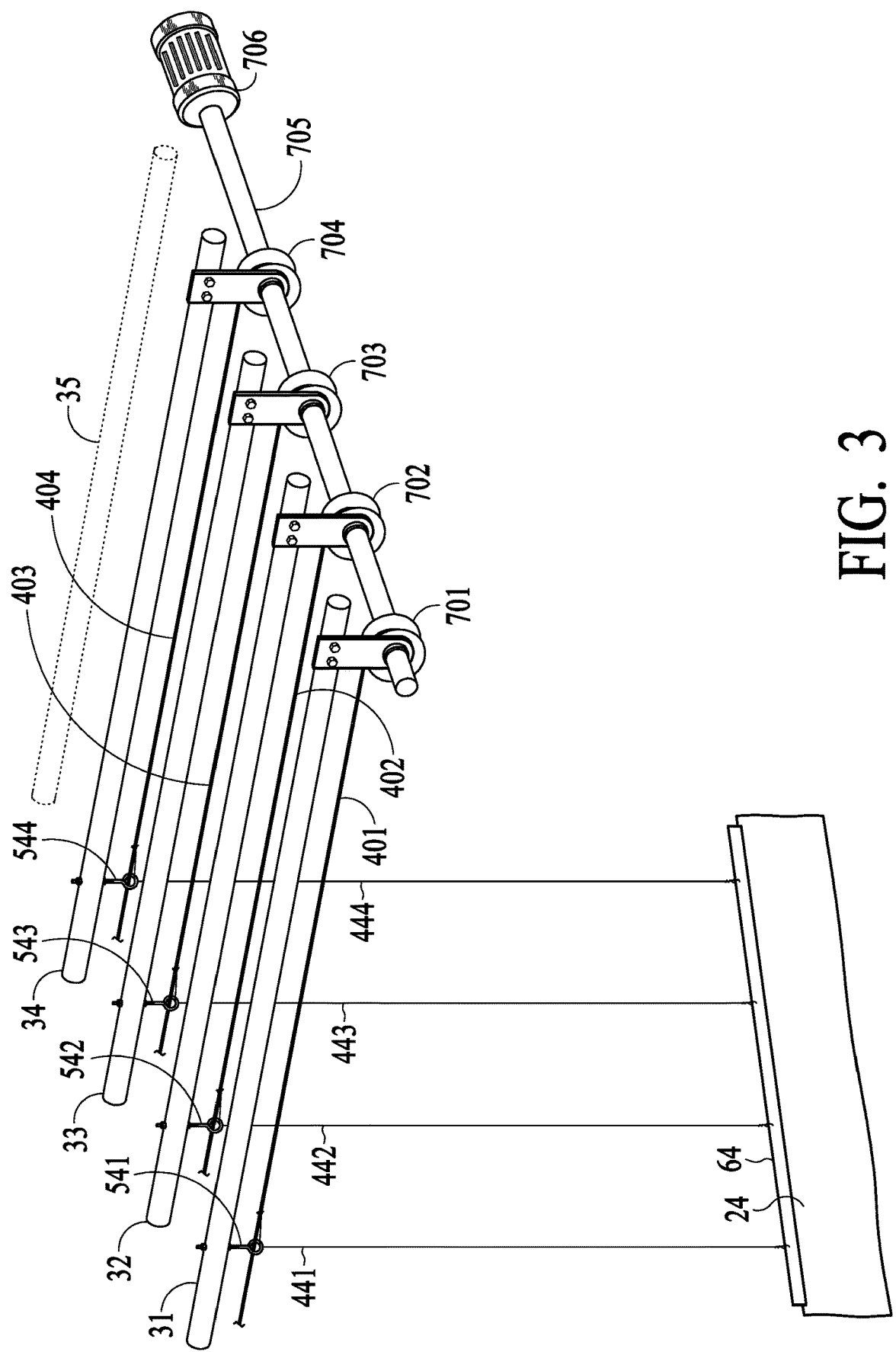
FIG. 3, FIG. 4 and FIG. 5 show additional detail of the bug-catching curtain system shown in FIG. 1 and FIG. 2 in accordance with an implementation.
Figure 4:
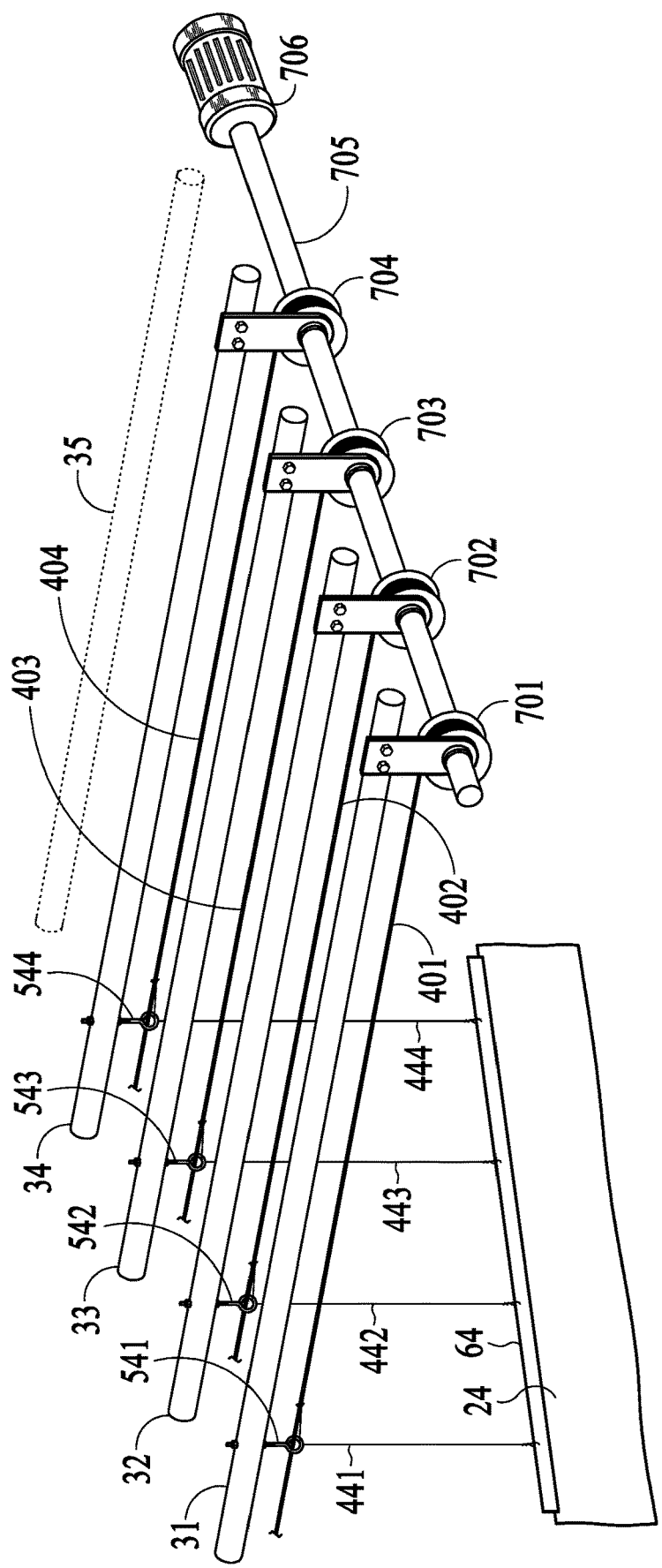

FIG. 3 and FIG. 4 illustrate use of an electric motor 706 to raise and lower bug-catching curtain material 21 through 24. Specifically, electric motor 706 is used to turn a drive shaft 705. A spool 701, a spool 702, a spool 703 and a spool 704 are mounted on drive shaft 705. Spool 701 is for primary cable 401. Spool 702 is for primary cable 402. Spool 703 is for primary cable 403. Spool 704 is for primary cable 404. As electric motor 706 turns drive shaft 705, depending on the direction of rotation, more or less of primary cable 401 through 404 is stored on spools 701 through 704. This results in the raising and lowering of bug-catching curtain material 21 through 24. For example, electric motor is a 300 Watt-24 volt motor connected to a 120 AC Voltage source by a transformer, and controlled by a two-way or a three-way 15 Amp or 20 Amp toggle switch.

Alternatively, instead of an electric motor, an non-motor powered method, such as a hand crank, can be used to turn drive shaft 705. Electric motor 706 or a hand crank can be connected directly to drive shaft 705, or can be connected, for example, through a sprocket system that uses chains or belts, or some other similar system to remotely connect electric motor 706 or a hand crank to drive shaft 705. Alternatively or in addition, electric motor 706 can be connected to a computer automation system and could be implemented to a timer or to sensor that system that, for example, will automatically raise and lower the bug curtains based on time of day and/or upon detecting a working approaching the crop protected by the bug curtains. The computer automation system can also be programmed to adjusting the height of the bug curtain based on plant canopy height as detected by sensors.

Figure 5:
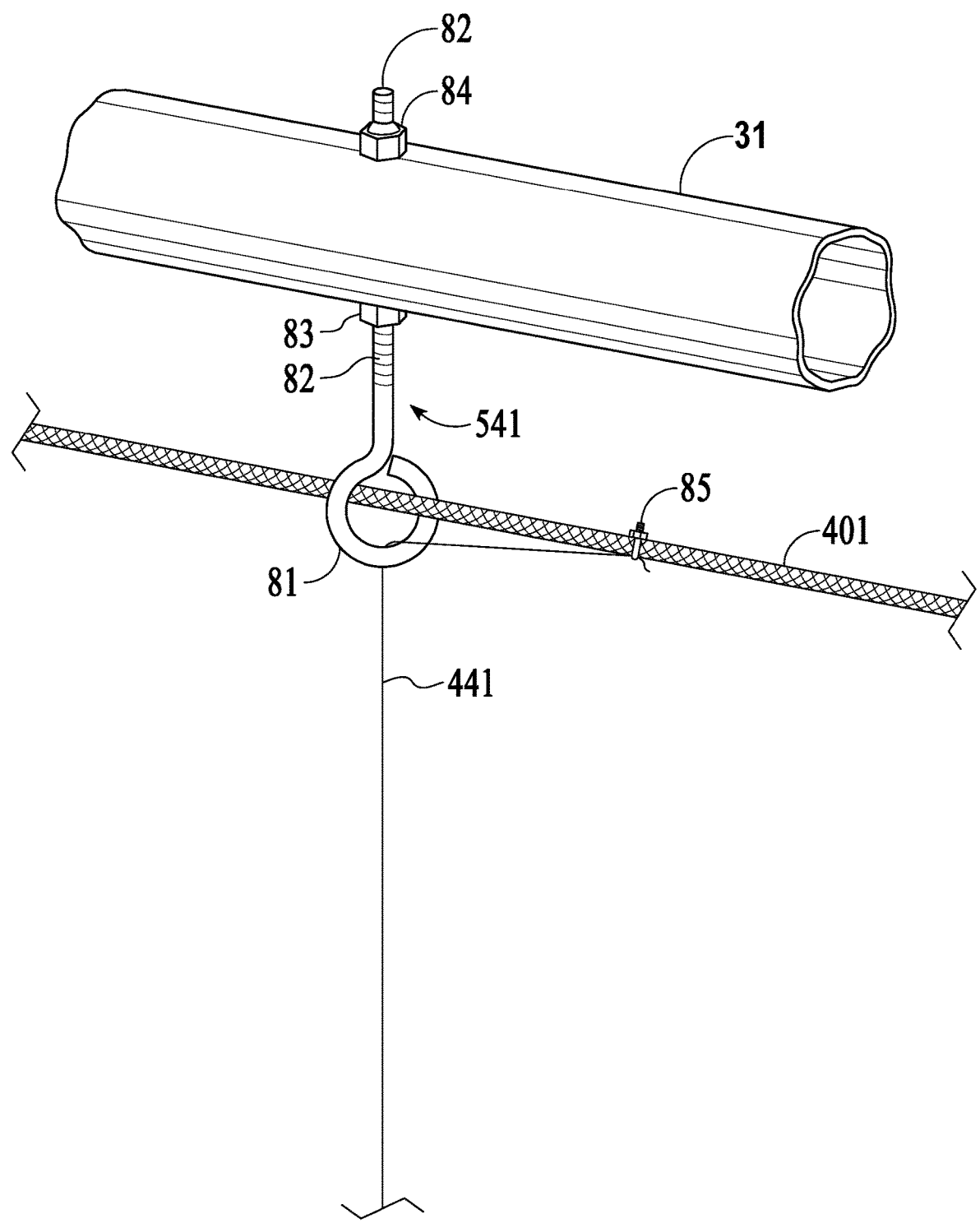

FIG. 5 gives additional detail. Eye bolt 541 is shown to include an "eye" region 81 and a threaded stem 82. For example, a nylon lock nut 84 and a standard nut 83 are used to attach eye bolt 541 firmly to structure section 31. A wire rope clip 85 is used to attach support cable 441 to primary cable 401. Wire rope clip 85 is located a sufficient distance from eye bolt 541 to allow bug-catching curtain material 24 to be raised and lowered within a full range of motion required for a particular implementation.

Planning performed before installing a bug-catching curtain system includes, for example, determining where the installation is to be made and the existing infrastructure, including, for example, determining eave height of a green house or other building used to house the bug-catching curtain system. The type of crops and their arrangements are then considered. This includes, for example, whether the crops are to be grown on beds or benches, and the projected height and width of the crops, distance between rows of crops and so on. Other details such as the quantity and shape of adhesive material, method of hanging, location of the motor powering the system and other structural configurations need to be determined depending on a particular implementation.

Next, the main structure for the bug-catching curtain system is built. For example, if galvanized tubes are used, swaged insert connectors and pipe straps can be used to connect galvanized tube sections. The shape of the main structure will depend on the implementation and whether the main structure is free-standing or attached to an existing building structure.

Locations for eye bolts can be marked and drilled, the eye bolts are attached to the main structure, for example, using nylon lock nuts and standard nuts. Each eye bolt is oriented to allow primary cables to pass through.

The motor is placed at a selected location with an associated drive shaft and spindles. For larger implementations, more than one motor and drive shaft may be used. The primary cables are attached to the spindles. Sufficient primary cable is included to allow the bug-catching curtain material to be lowered to the floor. The primary cables are threaded through the eye bolts, as shown in FIG. 1. The length of the primary cable extends all the way to the floor with an extra three to four feet as a margin.

At the end of the primary cables, the primary cables can be secured, for example, to a galvanized tube using eye bolts. Each primary cables can be looped through an eye bolt and secured using a wire rope clip. The galvanized tube provides, for example, counter weight.

The support cables are then measured and attached to the primary cables using wire rope clips. Each wire rope is passed through its associated eye bolt and then attached to a rail. For example, when attaching the support cables to the primary cables, the primary cables are let out from their spindle and the support cables are then attached to the primary cables. The support cables are measured so that the bug-catching curtain material can be lowered to the ground. The support cables are attached to the rails, for example by extending each support cable through a small hole in the rail and then locking the end of the support cable in a loop with a primary cable crimp. For example, the rails are poly lock rails for which wiggle wire is used to secure the bug-catching curtain material to the rails. Once the bug-catching curtain material is in place, limit switches of the electric motor can be adjusted to desired maximum lower and higher positions for the bug-catching curtain mechanisms.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A bug-catching curtain system comprising:
   a plurality of curtains composed of adhesive material suspended from rigid framing material;
   a support structure;
   an electric motor connected to the support structure;
   a drive shaft turned by the electric motor;
   a plurality of spindles mounted on the drive shaft;
   a plurality of primary cables extending out from the plurality of spindles;
   a plurality of support cables attached to the plurality of primary cables and to the rigid framing material; and
   a plurality of eye bolts attached to the support structure, wherein a primary cable from the plurality of primary cables and a support cable from the plurality of support cables are threaded through each eyebolt in the plurality of eyebolts;
   wherein the plurality of support cables suspend the plurality of curtains between rows of plants; and
   wherein a height at which the plurality of curtains are suspended is varied by using the electric motor to let out and to wind in primary cable.

2. A bug-catching curtain system as in claim 1, wherein the support structure comprises interconnected galvanized tube sections.

3. A bug-catching curtain system as in claim 1, wherein the structure is located within a greenhouse.

4. A bug-catching curtain system as in claim 1, wherein the adhesive material is bug-catching curtain material.

5. A bug-catching curtain system as in claim 1, wherein each primary cable in the plurality of primary cables is threaded through more than one eyebolt, and wherein each support cable in the plurality of support cable is threaded through only a single eye bolt.

6. A bug-catching curtain system as in claim 5, wherein each support cable from the plurality of support cables is connected to only one primary cable from the plurality of primary cables.

7. A bug-catching curtain system as in claim 6, wherein each primary cable from the plurality of primary cables is connected to more than one support cable from the plurality of support cables.

8. A method to protect rows of plants from insects, comprising:
   suspending a plurality of curtains composed of adhesive material suspended from rigid framing material, including;
   using a support structure to support a drive shaft, wherein a plurality of spindles are mounted on the drive shaft;
   attaching a plurality of primary cables to the spindles;
   attaching a plurality of support cables to the plurality of primary cables and to the rigid framing material so that the plurality of support cables suspend the plurality of curtains between the rows of plants and so that a height at which the plurality of curtains are suspended is varied by using turning the drive shaft so that the spindles let out and wind in the plurality of primary cables;
   attaching a plurality of eye bolts attached to the support structure; and
   threading a primary cable in the plurality of primary cables and a support cable in the plurality of support cables through each eyebolt in the plurality of eyebolts.

9. A method as in claim 8, additionally comprising:
   using an electric motor to turn the drive shaft.

10. A method as in claim 8, wherein each primary cable in the plurality of primary cables is threaded through more than one eyebolt, and wherein each support cable in the plurality of support cable is threaded through only a single eye bolt.

11. A method as in claim 10, wherein each support cable in the plurality of support cables is connected to only one primary cable in the plurality of primary cables.

12. A method as in claim 11, wherein each primary cable in the plurality of primary cables is connected to more than one support cable in the plurality of support cables.

13. A bug-catching curtain system comprising:
    a plurality of curtains composed of adhesive material suspended from rigid framing material;
    a support structure;
    a drive shaft supported by the support structure;
    a plurality of spindles mounted on the drive shaft;
    a plurality of primary cables extending out from the plurality of spindles;
    support cables attached to plurality of primary cables and to the rigid framing material; and
    a plurality of eye bolts attached to the support structure;
    wherein the support cables suspend the plurality of curtains between rows of plants; and
    wherein a height at which the plurality of curtains are suspended is varied by using the turning the drive shaft to let out and to wind in primary cable; and
    wherein a primary cable from the plurality of primary cables and a support cable from the plurality of support cables are threaded through each eyebolt in the plurality of eyebolts.

14. A bug-catching curtain system as in claim 13, additionally comprising:
    an electric motor used to turn the drive shaft.

15. A bug-catching curtain system as in claim 13, wherein the support structure comprises interconnected galvanized tube sections.

16. A bug-catching curtain system as in claim 13, wherein the structure is located within a greenhouse.

17. A bug-catching curtain system as in claim 13, wherein the adhesive material is bug-catching curtain material.

18. A bug-catching curtain system as in claim 13, wherein each primary cable in the plurality of primary cables is threaded through more than one eyebolt, and wherein each support cable in the plurality of support cable is threaded through only a single eye bolt.

19. A bug-catching curtain system as in claim 18, wherein each support cable from the plurality of support cables is connected to only one primary cable from the plurality of primary cables.

20. A bug-catching curtain system as in claim 19, wherein each primary cable from the plurality of primary cables is connected to more than one support cable from the plurality of support cables.

* * * * *